United States Patent Office
3,645,938
Patented Feb. 29, 1972

3,645,938
ADHESIVE COMPOSITIONS FOR WATER-WET CELLULOSIC MEMBRANES
Gerard J. Clarke, Rochester, and Martin E. Rowley, Hilton, N.Y., assignors to Eastman Kodak Company, Rochester, N.Y.
No Drawing. Filed Jan. 2, 1969, Ser. No. 788,613
Int. Cl. C09j 3/14
U.S. Cl. 260—17
2 Claims

ABSTRACT OF THE DISCLOSURE

Water-wet cellulose acetate membranes can be joined together effectively by use of a liquid adhesive composition containing 2-ethoxyethyl acetate and/or methyl ethyl ketone and a compatible polymer.

The adhesive compositions can also contain a small amount of a tackifying resin such as poly($\alpha$-methyl styrene).

---

This invention relates to special fluid compositions having the special ability to seal water-wet cellulosic membranes without causing excessive buckling, loss of usefulness, or loss of dimensional stability of the membranes.

The technology relating to so-called "reverse osmosis" processes for purifying salty or brackish waters is a relatively recent development. In "reverse osmosis" processes (sometimes referred to herein as "RO processes") a special membrane having the peculiar ability to permit passage of relatively pure water through the membrane while excluding salt and other dissolved materials is subjected to a pressure (on the impure water side of the membrane) of several hundred pounds per square inch for an extended period of time. During this pressure treatment, the purified water passes slowly through the membrane and is recovered for various uses. In some uses, such as in processes for concentrating fruit juices, the more concentrated material is recovered for use.

Many types of equipment have been devised to utilize useful "reverse osmosis" membranes in a multitude of ways. However, to date, the type of membranes that has found, by far, widest usage and acceptance in the art are those cellulosic (such as cellulose acetate) membranes made via special processes such as, for example, those detailed in U.S. Pat. 3,344,214 or those detailed in U.S. patent application Ser. No. 709,195, filed on Feb. 29, 1968 and U.S. patent application Ser. No. 709,226, filed on Feb. 29, 1968.

Most commercial scale equipment adapted to utilize such special "reverse osmosis" membranes require fairly large sheets or tubes of membrane material, the entire surfaces of whch must be absolutely leak proof, even under the high pressures of the RO processes. However, most processes for manufacturing commercially acceptable "RO" membranes are, as a practical matter, fairly limited in the size and shape of individual pieces (or rolls) of RO membrane that can be produced economically thereby. Hence, in order to adapt commercially available RO membrane to commercially feasible RO processing equipment, pieces or sheets of the membrane must often be sealed together. It can be appreciated from the foregoing that the resulting sealed joints must be essentially perfect in order to be at all acceptable. They must also be very strong in order to resist failure under the relatively high pressures involved.

Another very special requirement for any sealant or adhesive composition that might be considered a candidate for this type of system is that the adhesive composition must be able to function to seal cellulose acetate membranes that are completely saturated and "wet" with water. This requirement results from the fact that most RO membranes made from cellulose acetate must be stored, and ultimately used, in the never-dried condition, with the very porous membranes generally being stored until they are used in water filled (or at least very humid) containers.

Still another important requirement that any adhesive composition that is ultimately found to be "acceptable" for this use must meet is that of forming the required strong bond (between water-wet membrane surfaces) without causing the membranes to buckle, wrinkle, or otherwise lose their desired original shape. In addition, it is necessary that the adhesive composition be in a liquid or fluid condition, and that there be no necessity to apply heat in order to effectuate the final seal.

All of these requirements must be met in order for an adhesive composition to be considered acceptable for this intended use. For one reason or another, many materials such as many "solvents" for cellulose acetate that might appear to be possible candidates for the solution to this problem fail to meet all of these requirements. For example, acetone fails because its use causes undesired severe buckling and wrinkling of the membrane.

It has now been discovered that all of the foregoing requirements can be met via the use of an adhesive composition which contains:

(1) at least about 25 weight percent of 2-ethoxyethyl acetate, methyl ethyl ketone, or a mixture thereof, and
(2) at least about 2 weight percent of one or more synthetic polymeric material that is soluble in the adhesive composition, compatible with the cellulose acetate, and has the ability to impart increased viscosity to the adhesive composition.

If desired, the 2-ethoxyethyl acetate or the methyl ethyl ketone can be the sole organic solvent in the adhesive compositions of this invention. However, other organic materials can also be present in these compositions so long as they are dissolved therein and do not detract substantially from the beneficial results that can be obtained by use of the basic two component compositions set out above. Examples of other organic materials include dyes (to make more readily apparent the areas on the wet membranes of adhesive application) and other polymeric materials such as poly($\alpha$-methyl styrene) which serves as a helpful tackifying agent at levels of from about 0.2 to about 7 weight percent of the composition in one of the preferred embodiments of the present invention. Dispersed pigments can also be used in these compositions if desired.

Examples of the "synthetic polymeric materials" described in point (2), above, include, but are not limited to the vinyl acrylic copolymers, both copolymerized and graft-type, carboxylated polyvinyl acetates (such as those sold under the trade name "Gelva" by Monsanto Company), and aryl sulfonamide-formaldehyde resins (such as "Santolite MHP" sold by Monsanto Company), and compatible, water insoluble, cellulosic polymers having intrinsic viscosities of at least about 0.2 (such as cellulose acetate). Mixtures of these polymeric materials can also be used. It is preferred that the total amount of synthetic polymeric materials in the adhesive compositions of this invention represent from about 2 to about 40 weight percent of the composition. Conversely, it is preferred that the amount of organic solvent material in thse compositions represent from about 60 to about 98 weight percent of the compositions. Compatible "plasticizer" materials such as dibutyl phthalate, butyl benzyl phthalate and the like can also be present in amounts below about 10 weight percent of the polymers.

Whether any material is or is not "compatible" can readily be determined by preparing two solutions of the material in 2-ethoxyethyl aceate. The solutions contain (parts by weight):

| Solution | 1 | 2 |
|---|---|---|
| 2-ethoxyethyl acetate | 95 | 80 |
| Cellulose acetate | 2.5 | 10 |
| Material to be tested | 2.5 | 10 |

Five mil thick films of these solutions are cast on glass plates and permitted to dry under ambient conditions for 24 hours. If both films are clear after drying, the material is "compatible" with cellulose acetate. Otherwise, it is not "compatible" in the context of the compositions of this invention.

In the following examples, all "parts" given are by weight unless otherwise specified.

EXAMPLE 1

Two edges of RO membrane (that has just been removed from storage under water) are wiped with absorbent paper to remove excess water from the surfaces of the edge areas. A small amount of the following adhesive composition

| | Parts |
|---|---|
| Cellulose acetate (40% acetyl, I.V.=1) | 10 |
| 2-ethoxyethyl acetate | 45 |
| Methyl ethyl ketone | 45 | is applied with a brush to both of the membrane edge surfaces that are to be sealed together. The coated edges are then placed together, with mild hand pressure being applied after finally positioning the edges as desired, with about ⅛ inch overlap. The resulting joined membrane is then placed into water. After being in water for only a few minutes, the membranes are sealed together tightly.

This sealed membrane is then subjected to a standard test for "reverse osmosis membrane" candidates, in which test salt water (0.5% NaCl) is forced against the membrane under 600 p.s.i. pressure (over part of the new seal) for an extended period of time. The salt rejection characteristic and the flux rates are identical to those of portions of the original membrane without the seal that are tested. This indicates conclusively that the seal is complete, since a mere "pin-hole" in the seal would permit passage of a substantial amount of the concentrated salt solution directly through the test piece, thus yielding significantly poorer salt rejection data.

EXAMPLE 2

The adhesive formulations appearing in following table are all excellent adhesives for "wet" cellulosic "reverse osmosis" membranes when tested as shown in Example 1.

TABLE I.—EFFECTIVE ADHESIVE COMPOSITIONS

| Example No.: | Parts | Ingredient |
|---|---|---|
| 2 | 10 | Cellulose acetate (I.V.=1.6). |
| | 90 | 2-ethoxyethyl acetate. |
| 3 | 10 | Vinyl acrylic copolymer.[1] |
| | 20 | 2-ethoxyethyl acetate. |
| 4 | 10 | Vinyl acrylic copolymer.[1] |
| | 12 | Methyl ethyl ketone. |
| | 12 | 2-ethoxyethyl acetate. |
| 5 | 10 | Cellulose acetate. |
| | 90 | Methyl ethyl ketone. |
| 6 | 10 | Vinyl acrylic copolymer.[1] |
| | 1 | Poly(α-methyl styrene).[2] |
| | 20 | 2-ethoxyethyl acetate. |
| 7 | 5 | Cellulose acetate. |
| | 5 | Poly(α-methyl acrylate). |
| | 80 | 2-ethoxyethyl acetate. |
| | 0.1 | Dark red soluble dye. |
| 8 | 10 | Carboxylated poly(vinylacetate).[3] |
| | 10 | Arylsulfonamide-formaldehyde resin.[4] |
| | 60 | 2-ethoxyethyl acetate. |
| | 20 | Methyl ethyl ketone. |
| 9 | 10 | Vinyl acrylic copolymer.[1] |
| | 20 | 2-ethoxyethyl acetate. |
| | 1 | Dibutyl phthalate. |
| 10 | 10 | Cellulose acetate. |
| | 45 | 2-ethoxyethyl acetate. |
| | 45 | Methyl ethyl ketone. |
| | 1 | Poly(α-methyl styrene).[2] |
| | 1 | Butyl benzyl phthalate. |

[1] Such as is sold by National Starch and Chemical Corp. under the trade name of "Resyn 26-2404."
[2] Such as is sold by Dow Chemical Company under the trade name of Dow Resin "276-V2."
[3] Such as is sold by Monsanto Company under the trade name of "Gelva C-3."
[4] Such as is sold by Monsanto Company under the trade name of "Santolite MHP."

The invention has been described in detail with particular reference to preferred embodiments thereof, but it will be understood that variations and modifications can be effected within the spirit and scope of the invention.

We claim:
1. A liquid adhesive composition specially adapted to bond water-wet membranes of cellulose acetate; said adhesive composition consisting of about 5 parts by weight of cellulose acetate having an intrinsic viscosity of at least about 0.2 and about 5 parts by weight of poly(α-methyl acrylate) dissolved in about 80 parts by weight of 2-ethoxy-ethyl acetate; the viscosity of said adhesive composition being at least about 10 centipoises.

2. A liquid adhesive composition specially adapted to bond water-wet membranes of cellulose acetate; said adhesive composition consisting of about 10 parts by weight of cellulose acetate, having an intrinsic viscosity of at least about 0.2, about 1 part by weight of poly(α-methyl styrene), and about 1 part by weight of butyl benzyl phthalate all dissolved in a mixture of about 45 parts of methyl ethyl ketone and about 45 parts of 2-ethoxyethyl acetate; the viscosity of said adhesive composition being at least about 10 centipoises.

References Cited

UNITED STATES PATENTS 3,373,056    3/1968    Martin _____ 260—17 XR

WILLIAM H. SHORT, Primary Examiner

L. M. PHYNES, Assistant Examiner

U.S. Cl. X.R.

260—31.2, 32.8 R, 823; 106—196